UNITED STATES PATENT OFFICE.

PHILIP M. GALLAHER, WILLET LLOYD, AND GEORGE S. WALKER, OF DANVILLE, PENNSYLVANIA.

IMPROVEMENT IN BLASTING-POWDER.

Specification forming part of Letters Patent No. 210,197, dated November 26, 1878; application filed April 29, 1878.

*To all whom it may concern:*

Be it known that we, PHILIP M. GALLAHER, WILLET LLOYD, and GEORGE S. WALKER, of Danville, in the county of Montour and State of Pennsylvania, have invented certain new and useful Improvements in Blasting-Powder; and we do hereby declare that the following is a full, clear, and exact description thereof, which will enable others skilled in the art to which it pertains to make and use the same.

The object of our invention is to furnish a blasting-powder which, while possessing a greater degree of strength than the ordinary powders, will not be dangerous to handle, transport, or use, and from which there will arise no injurious gases after explosion.

It consists of nitrate of soda or potash, sulphur, charcoal, ground bark, and sulphate of iron and copper, dissolved and mixed as hereinafter described.

In the manufacture of our improved blasting-powder we use the ingredients in the following proportions: nitrate of soda or potash, seventy to eighty parts; sulphur, six to twelve parts; charcoal, eight to sixteen parts; sulphate of iron, one to three parts; sulphate of copper, one-half to one part; ground bark, eight to fourteen parts.

The nitrate and sulphates are placed in a flat-bottomed steam-kettle, with sufficient water to dissolve them at a temperature of 220° Fahrenheit. The sulphur, charcoal, and bark, having been thoroughly pulverized and intermixed by means of a mixing-drum or other suitable machinery, are then added to the solution and stirred into it by means of a revolving stirrer and stationary arms within the kettle, and the mass boiled at a temperature of about 250° Fahrenheit. The heat and stirring are continued until as much of the water is evaporated as is possible while in the mass. The powder will then appear dry; but some moisture will yet remain, and for the purpose of driving this off it is placed in a drying room or kiln in the following manner: It is taken from the kettle and run through a wire screen of one-fourth to one-half inch mesh directly upon trays having canvas or wire-cloth bottoms. This not only removes all large lumps that may form while cooling, but leaves it on the trays in a loose condition, the most favorable for rapid drying. The trays are then placed in a kiln heated by means of a steam-coil, and allowed to remain until thoroughly dry, the inside temperature being kept at from 150° to 180° Fahrenheit. It is then removed and screened to produce a uniform grain. The lumps that pass over the screen are then crushed between wooden rolls, to produce the same degree of granulation.

The sulphate of iron is used as a mordant, to produce a uniform dark color and to improve the appearance of the powder.

The bark is used as a slow carbon, which, possessing peculiar properties in itself, not only aids greatly in producing a large volume of gas at a high temperature, but also in rendering the powder non-explosive.

The sulphate of copper is added for the double purpose of, first, to correct or neutralize impurities, and thereby lessen the volume of smoke generated by the explosion, and, second, to produce more desirable color for the powder.

The commercial nitrates are not pure, but contain from one to four or six per cent. of impurities, which, if allowed to remain in the powder, will not only impair its strength, but contribute largely to increase the volume of smoke when exploded. The impurities are nearly, if not quite, neutralized or decomposed by the addition of sulphate of copper to the composition during the process of manufacture, as hereinbefore explained, and pass off in the form of gases, leaving the powder a purer and more effective compound, so that the amount of smoke following an explosion is lessened twenty-five to thirty per cent. In addition to the foregoing the sulphate of copper gives a much more desirable color to the powder than is given by the sulphate of iron alone.

This compound possesses special advantages:

First, it is less dangerous than blasting-powders of ordinary composition, which are liable to be exploded by slight handling or jars.

Second, it cannot be ignited by friction or concussion, and can only be exploded by actual contact with fire, and then only when confined, as in a drill-hole.

Third, it possesses greater strength, a less quantity being required to obtain a given result than is required of similar compounds in ordinary use.

Fourth, its explosion is not followed by a blaze of fire, as is the case with ordinary powders, and in mines subject to an accumulation of fire-damp this is a very important object, as "damp" is often exploded from this cause.

Fifth, its explosion is followed by no injurious gases, such as attend the explosion of common powders. It can therefore be used in close places without endangering the health of those using it. This desirable quality is obtained as follows: The formula is so perfectly adjusted, each ingredient being present in such exact chemical proportions to the others, that the decomposition, when exploded, is perfect and the combustion of the sulphur and carbons complete. This is aided by the mode of stirring while boiling, thus insuring a perfect incorporation of the ingredients, the gases formed being so light they readily disperse before their presence is noticed.

We are aware that the nitrate of soda or potash, sulphur, charcoal, bark, and sulphate of iron have been used variously in combination in the manufacture of blasting-powders, and we do not claim them as our invention; but, Having described our invention, what we claim, and desire to secure by Letters Patent, is—

The combination, with nitrate of soda or potash, sulphur, charcoal, ground bark, and sulphate of iron, of sulphate of copper, all taken in about the proportions as and for the purposes set forth.

In testimony that we claim the foregoing as our own we affix our signatures in presence of two witnesses.

PHILIP M. GALLAHER.
WILLET LLOYD.
GEORGE S. WALKER.

Witnesses:
WM. H. BOURNE,
F. C. DERR.